United States Patent
Yuan

(10) Patent No.: US 9,343,965 B2
(45) Date of Patent: May 17, 2016

(54) SWITCHING REGULATOR AND CONTROL CIRCUIT AND CONTROL METHOD THEREFOR

(71) Applicant: Silergy Semiconductor Technology (Hangzhou) Ltd., Hangzhou (CN)

(72) Inventor: Xiaolong Yuan, Hangzhou (CN)

(73) Assignee: Silergy Semiconductor Technology (Hangzhou) Ltd., Hangzhou (CN)

( * ) Notice: Subject to any disclaimer, the term of this patent is extended or adjusted under 35 U.S.C. 154(b) by 29 days.

(21) Appl. No.: 14/582,309

(22) Filed: Dec. 24, 2014

(65) Prior Publication Data

US 2015/0188430 A1   Jul. 2, 2015

(30) Foreign Application Priority Data

Dec. 26, 2013  (CN) .......................... 2013 1 0731190

(51) Int. Cl.
| G05F 1/00 | (2006.01) |
| H02M 3/156 | (2006.01) |
| H02M 1/00 | (2006.01) |

(52) U.S. Cl.
CPC ...... *H02M 3/156* (2013.01); *H02M 2001/0032* (2013.01); *Y02B 70/16* (2013.01)

(58) Field of Classification Search
CPC .... H02M 3/156; H02M 3/1588; H02M 3/157
USPC .......................... 323/222, 271, 282–286, 288
See application file for complete search history.

(56) References Cited

U.S. PATENT DOCUMENTS

| 6,160,388 A * | 12/2000 | Skelton ............... H02M 3/1588 323/282 |
| 2013/0043849 A1* | 2/2013 | Pagano ................. H02M 3/156 323/271 |
| 2014/0292295 A1* | 10/2014 | Lee ....................... H02M 3/156 323/282 |

FOREIGN PATENT DOCUMENTS

| CN | 102684458 A | 9/2012 |
| CN | 103236795 A | 8/2013 |
| CN | 103368360 A | 10/2013 |
| CN | 103683868 A | 3/2014 |
| CN | 103683908 A | 3/2014 |

* cited by examiner

*Primary Examiner* — Nguyen Tran
(74) *Attorney, Agent, or Firm* — Westman, Champlin & Koehler, P.A.

(57) ABSTRACT

Disclosed are a switching regulator and a control circuit and a control method therefor. In one embodiment, the control circuit generates a supplementary signal varying with a state parameter of the power stage in a first mode and keeps the supplementary signal substantially unchanged in a second mode with respect to the value thereof at the moment of switching from the first mode to the second mode so that the supplementary signal at the moment of mode switching is maintained substantially constant, therefore, a steady state can be achieved quickly, and ripples in the output voltage are restrained.

20 Claims, 8 Drawing Sheets

SWITCHING REGULATOR AND CONTROL CIRCUIT AND CONTROL METHOD THEREFOR

CLAIM OF PRIORITY AND CROSS-REFERENCE TO RELATED APPLICATION(S)

This application claims the benefit of Chinese Patent Application No. 201310731190.X, filed on Dec. 26, 2013, which is incorporated herein by reference in its entirety.

BACKGROUND OF THE INVENTION

1. Field of the Invention

The present invention relates to the field of power electronics, and particularly to a switching regulator and a control circuit and a control method therefor.

2. Description of the Related Art

A switching regulator typically comprises a power stage and a control circuit. The control circuit can consider variations in an input voltage, internal parameters and external loads, and can regulate the ratio of on/off time of the switch system in the power stage, so that an output voltage or an output current of the switching regulator can be maintained as substantially constant. Therefore, the design of a particular control circuitry and approach is very important to the overall performance of the switching power supply. Thus, adopting different detection signals and/or control circuits may result in different control effects on performance.

Control circuits in the prior art implement control by means of voltage feedback and current feedback, which generate a switching control signal to control a power switch in a power stage in accordance with feedback signal from an output of the power stage and an expected reference voltage. In the prior art, a supplementary signal is superimposed to the feedback voltage or the reference voltage so that the control circuit can respond to variations in the power stage quickly.

However, control circuits using the supplementary signal would lose the control of the supplementary signal when the power stage switches to a large capacitance loaded or light loaded condition. Therefore, when the power stage switches back to a normal condition, there is required multiple cycles to recover a steady state. This results in that the voltage ripple may be at a high level.

BRIEF DESCRIPTION OF THE INVENTION

In view of this, one of the objects of the present disclosure is to provide a switching regulator and a control circuit and a control method therefor.

In accordance with one aspect of the present disclosure, there is provided a control circuit for controlling a switching regulator, comprising:

a supplementary signal generator configured to generate a supplementary signal;

a superimposing circuit configured to superimpose said supplementary signal with a first signal to generate a superposition;

a state detection circuit configured to generate a state signal in accordance with a second signal and the superposition;

a clock generator configured to generate a clock signal; and a switching control signal generator configured to generate a switching control signal in accordance with the state signal and the clock signal;

Wherein the supplementary signal generator is configured to generate a supplementary signal varying with a state parameter of a power stage in a first mode and to impede the supplementary signal from deviating from a value thereof at the moment of switching from the first mode to the second mode.

In accordance with another aspect of the present disclosure, there is provided a switching regulator comprising a power stage and a abovementioned control circuit.

In accordance with another aspect of the present disclosure, there is provided a control method for a switching regulator, comprising:

generating a supplementary signal varying with a state parameter of a power stage in a first mode, and impeding a variation of the supplementary signal with respect to a value thereof at the moment of switching from the first mode to a second mode in the second mode;

superimposing the supplementary signal and a first signal to generate a superposition;

generating a state signal in accordance with a second signal and the superposition;

generating a clock signal; and generating a switching control signal in accordance with the state signal and the clock signal to control a power switch in the power stage.

In the present disclosure, the control circuit generates a supplementary signal varying with state of the power stage in a first mode and keeps the supplementary signal substantially unchanged in a second mode with respect to the value at the moment of switching from the first mode to the second mode so that the value of the supplementary signal at the moment of mode switching is maintained substantially constant, therefore, a steady state is achieved quickly, and ripples in the output voltage are restrained.

BRIEF DESCRIPTION OF THE DRAWINGS

The implementations of the disclosure are illustrated in the drawings. The drawings and implementations provide some embodiments of the disclosure non-exclusively without limitation, wherein.

DETAILED DESCRIPTION OF EMBODIMENTS OF THE INVENTION

Reference will now be made in detail to particular embodiments of the disclosure, examples of which are illustrated in the accompanying drawings. However, the present disclosure is intended to encompass any substitutions, modifications, equivalents, etc., made thereto without departing from the spirit and scope of the present disclosure. In the description below, a number of particular details are explained to provide a better understanding to the disclosure. However, it is apparent to those skilled in the art the disclosure can be implemented without these particular details. In other instances, well known circuits, materials or methods are not described so as not to obscure the aspects of the present disclosure.

In addition, it is to be understood that the drawings are only for illustration purpose, and these drawings are not necessarily drawn to scale.

Also, it is to be understood that when an element is referred to as being "connected to," or "coupled to" another element, it may be directly connected or coupled to the other element, or intervening elements may be present. Two elements may be connected to each other physically, electronically, logically, or in any other manner, through one or more additional elements. In contrast, when an element is referred to as being "directly connected to," or "directly coupled to" another element, there may be no intervening elements present. Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to."

Also, unless indicated otherwise from the context of its use herein, the terms "known", "fixed", "given", "certain", and "predetermined" generally refer to a value, quantity, parameter, constraint, condition, state, process, procedure, method, practice, or combination thereof that is, in theory, variable, but is typically set in advance and not varied thereafter when in use.

In the description below, terms such as "first," and "second," are used herein for purposes of description and are not intended to indicate or imply relative importance or significance. In addition, unless the context clearly requires otherwise, term "a plurality of" is to be construed as "more than two".

In the description below, "power switch" refers to a switch element in a switching regulator, by turning on which, an inductive element in the switching regulator starts to store energy which leads to rise of a current on the inductive element. Correspondingly, "rectifying element" refers to an element in a switching regulator, which is turned on actively or passively so that the inductive element starts to release energy, which leads to drop of the current on the inductive element.

The present disclosure may be presented in various forms, some examples of which will be described below.

Figure 1A:
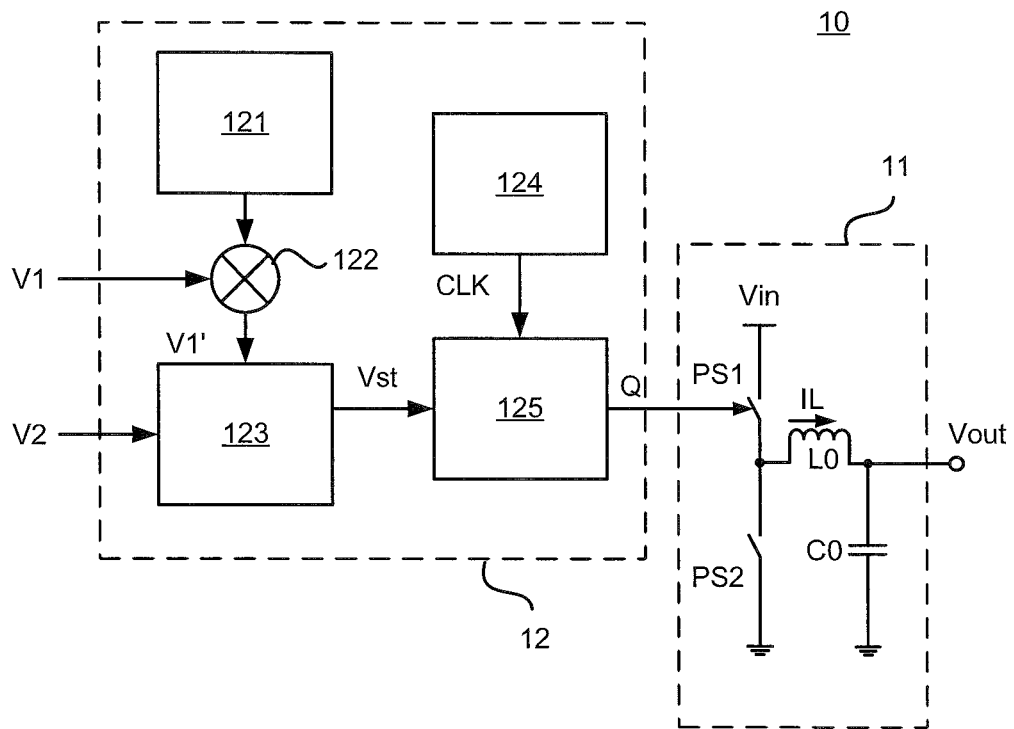
FIG. 1A is a schematic diagram of a switching regulator in accordance with a first embodiment of the present disclosure.

FIG. 1A is a schematic diagram of a switching regulator in accordance with a first embodiment of the present disclosure. As shown in FIG. 1A, switching regulator 10 comprises power stage 11 and control circuit 12.

Power stage 11 comprises power switch PS1, rectifying element PS2, inductive element L0 and filtering element C0.

Wherein, power switch PS1 may be any controlled semiconductor switching device, such as Metal Oxide Semiconductor Field Effect Transistor (MOSFET), Insulated Gate Bipolar Transistor (IGBT) etc. Rectifying element PS2 is electrically coupled to power switch PS1. In the present embodiment, rectifying element PS2 may adopt a diode or any kind of controlled semiconductor switch such as Metal Oxide Semiconductor Field Effect Transistor (MOSFET), Insulated Gate Bipolar Transistor (IGBT) etc. Inductive element L0 is electrically coupled to power switch PS1 which switches between states of storing energy and releasing energy with on and off of power switch PS1. Inductive element L0 may be an inductor or a transformer. Filtering element C0 is configured to smooth output voltage Vout, which may be a capacitor or a filtering circuit.

In FIG. 1A, power stage 11 is configured as a buck topology. However, it is to be understood by those skilled in the art that power stage 11 may adopt other well-known circuit topologies such as a boost topology and a buck-boost topology as necessary.

Control circuit 12 comprises supplementary signal generator 121, superimposing circuit 122, state detection circuit 123, clock generator 124 and switching control signal generator 125.

Wherein, supplementary signal generator 121 is configured to generate a supplementary signal.

Superimposing circuit 122 is configured to superimposing the supplementary signal and first signal V1 to generate a superposition V1'.

State detection circuit 123 is configured to generate state signal Vst in accordance with second signal V2 and first superposition V1'.

Particularly, first signal V1 may be feedback voltage Vfb, and second signal V2 may be reference voltage Vref. Alternatively, first signal V1 may be reference voltage Vref, and second signal V2 may be feedback voltage Vfb.

Feedback voltage Vfb is obtained from output voltage Vout of power stage 11.

Wherein, state signal Vst may represent the state of an output voltage of power stage 11. Therefore, state signal Vst may further be used to generate switching control signal Q with clock signal CLK with a predetermined configuration. Switching control signal Q is configured to control power switch PS1 in power stage 11.

In the present embodiment, supplementary signal generator 121 generates a supplementary signal varying with a state parameter of the power stage in a first mode, and impedes the supplementary signal from deviating from the value thereof at the moment of switching from the first mode to a second mode in the second mode. In other words, in the second mode, the supplementary signal is maintained unchanged with respect to its value when switching from the first mode to the second mode.

Wherein, the first mode is a normal condition of the power stage in which power stage 11 is controlled by control circuit 12 to output substantially constant output voltage Vout.

The second mode is a light loaded, unloaded or large capacitance loaded condition which may be represented by mode signal STDBY obtained by detecting the state of the power stage. Mode signal STDBY is logical valid in the second mode.

Clock generator 124 is configured to generate clock signal CLK.

Switching control signal generator 125 is configured to generate switching control signal Q for controlling power switch PS1 in accordance with state signal Vst and clock signal CLK.

It is to be understood by those skilled in the art that, in accordance with different types of control circuits 12, state signal Vst and clock signal CLK may be configured in various ways, and switching control signal generator 125 may adopt different configurations.

Figure 1B:
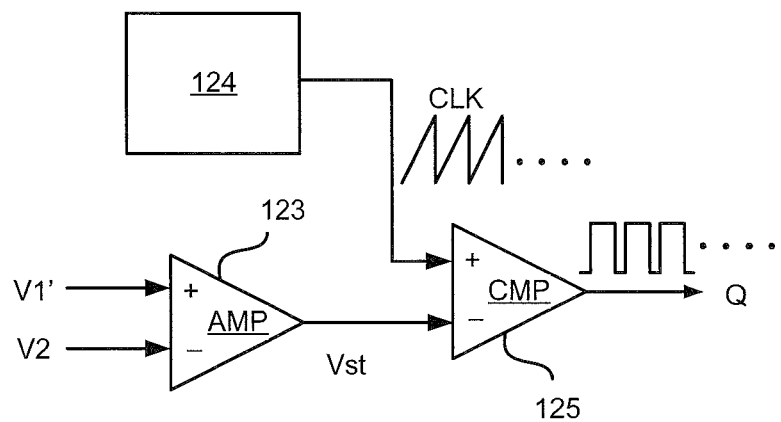
FIG. 1B is a schematic diagram of a control circuit in accordance with one preferable implementation of the first embodiment.

For example, as shown in FIG. 1B, in control circuit 12 implementing PWM control, state detection circuit 123 may be an operational amplifier, and state signal Vst may be a voltage varying with a state parameter of the power stage. Clock signal CLK is a triangular wave with predetermined frequency and amplitude. Meanwhile, switching control signal generator 125 is a comparator, which chops clock signal CLK configured as a triangular wave with state signal Vst to obtain a PWM signal as switching control signal Q.

Figure 1C:
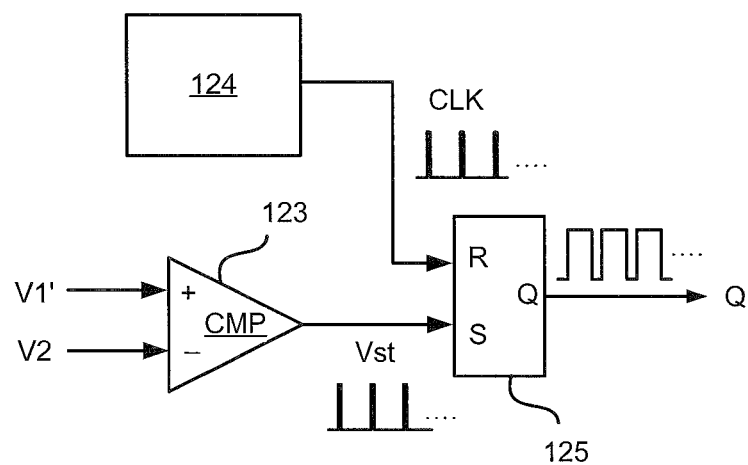
FIG. 1C is a schematic diagram of a control circuit in accordance with another preferable implementation of the first embodiment.

In another example, as shown in FIG. 1C, in control circuit 12 implementing PFM control, state signal Vst may be a signal representing current peaks or current valleys of the inductive element, which comprises pulses occurring at energy peak or energy valley of the inductive element. Clock signal CLK is a pulse sequence with a predetermined frequency, or a pulse sequence representing energy valley or energy peak of the inductive element accordingly. Meanwhile, switching control signal generator 125 is an RS flip-flop, which is set or reset by state signal Vst, and reset or set accordingly by clock signal CLK to obtain switching control signal Q.

In the present embodiment, the control circuit generates a supplementary signal varying with a state parameter of the power stage in a first mode and keeps the supplementary signal substantially unchanged in a second mode with respect to the value thereof at the moment of switching from the first mode to the second mode so that the supplementary signal is maintained substantially constant since the moment of mode switching, therefore, a steady state can be achieved quickly, and ripples in the output voltage are restrained.

Figure 2A:
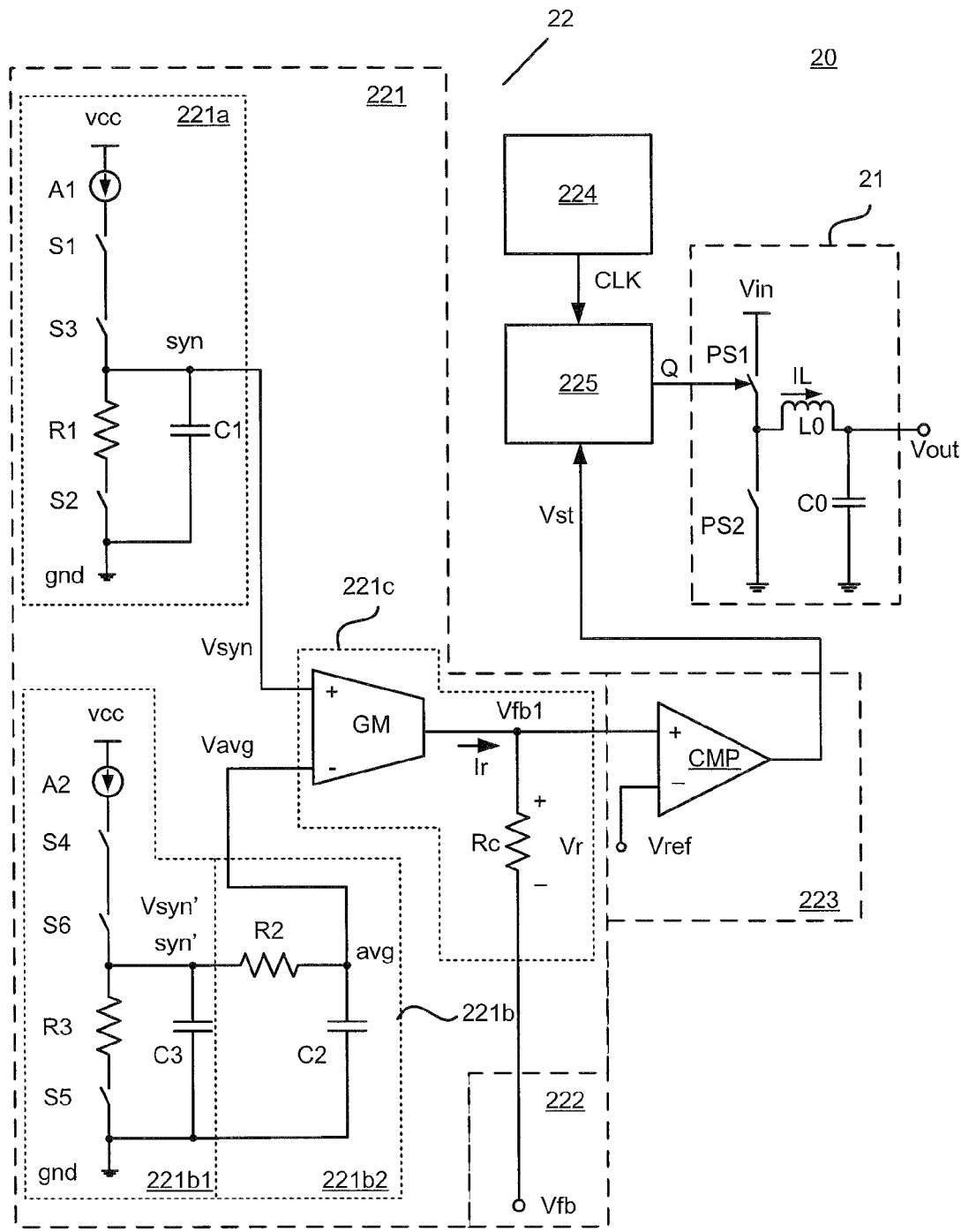
FIG. 2A is a schematic diagram of a switching regulator in accordance with a second embodiment of the present disclosure.

FIG. 2A is a schematic diagram of a switching regulator in accordance with a second embodiment of the present disclosure. As shown in FIG. 2A, switching regulator 20 comprises power stage 21 and control circuit 22. Wherein, the power stage 21 is substantially the same as the power stage shown in FIG. 1A, and will not be illustrated hereinafter. It is to be understood by those skilled in the art that power stage 11 may adopt other well-known circuit topologies such as a boost topology and a buck-boost topology as necessary.

Control circuit 22 comprises supplementary signal generator 221, superimposing circuit 222, state detection circuit 223, clock generator 224 and switching control signal generator 225.

In the present embodiment, first signal V1 is feedback voltage Vfb, and second signal V2 is reference voltage Vref. Feedback Vfb is obtained from output voltage Vout of power stage 21.

The supplementary signal comprises ripple voltage Vr. Supplementary signal generator 221 is ripple generator 221 configured to generate ripple voltage Vr.

Superimposing circuit 222 is configured to superimpose ripple voltage Vr and feedback voltage Vfb to generate superposition Vfb1.

State detection circuit 223 is configured to generate state signal Vst in accordance with superposition Vfb1 and reference voltage Vref.

Clock generator 224 is configured to generate clock signal CLK.

Switching control signal generator 225 is configured to generate switching control signal Q for controlling power switch PS1 in power stage 21 in accordance with state signal Vst and clock signal CLK.

It is to be understood by those skilled in the art that, in accordance with different types of control circuits 22, state signal Vst and clock signal CLK may be configured in various ways, and switching control signal generator 225 may adopt different configurations, which would not described hereinafter.

In the present embodiment, state signal Vst may represent the state of the output voltage of power stage 21. Therefore, state signal Vst may further be used to generate switching control signal Q with clock signal CLK with predetermined configuration.

Ripple generator 221 is configured to generate ripple voltage Vr synchronous with an inductor current of the inductive element of the power stage in accordance with a signal synchronous with switching control signal Q (which is preferably a feedback switching control signal) in a first mode, and impedes ripple voltage Vr in a second mode from deviating from the value thereof at the moment of switching from the first mode to the second mode. In other words, ripple voltage Vr is maintained substantially unchanged in the second mode after switching from the first mode to the second mode.

Wherein, the first mode is a normal condition of the power stage in which power stage 21 is controlled by control circuit 22 to output substantially constant output voltage Vout.

The second mode is a light loaded, unloaded or large capacitance loaded condition which may be represented by mode signal STDBY.

In the present embodiment, ripple generator 221 comprises first synchronous voltage generator 221a, average generator 221b and error amplifier 221c.

First synchronous voltage generator 221a is configured to generate first synchronous voltage Vsyn synchronous with the inductor current in the first mode, and to maintain the voltage on synchronous terminal syn, i.e. to maintain first synchronous voltage Vsyn unchanged in the second mode with respect to the value thereof at the moment of switching from the first mode to the second mode.

More specifically, as shown in FIG. 2A, first synchronous voltage generator 221a comprises first current source A1, first switch S1, second switch S2, first resistor R1, first capacitor C1 and third switch S3.

Wherein, first current source A1, first switch S1 and third switch S3 are coupled in series between input terminal vcc and synchronous terminal syn. First resistor R1 and second switch S2 are coupled in series between synchronous terminal syn and ground gnd, and first capacitor C1 is coupled between synchronous terminal syn and ground gnd.

Wherein, first switch S1 and second switch S2 are controlled by mode signal STDBY which are both on in the first mode and both off in the second mode. Third switch Stl is controlled by a signal synchronous with switching control signal Q which is preferably a feedback switching control signal.

Average generator 221b is configured to generate average Vavg of the first synchronous voltage in the first mode, and to impede a voltage on an average output terminal from deviating, i.e. to maintain the voltage on the average output terminal unchanged.

More specifically, average generator 221b comprises second synchronous voltage generator 221b1 and filtering circuit 221b2, wherein, second synchronous voltage generator 221b1 is the same with first synchronous voltage generator 221a and is configured to generate second synchronous voltage Vsyn' same as first synchronous voltage Vsyn. Filtering circuit 221b2 is coupled to terminal syn' of second synchronous voltage generator 221b1 and configured to output average Vavg of second synchronous voltage Vsyn'.

As shown in FIG. 2A, in the present embodiment, second synchronous voltage generator 221b1 comprises second current source A2, fourth switch S4, fifth switch S5, third resistor R3, third capacitor C3 and sixth switch S6. Filtering circuit 221b2 comprises second resistor R2 and second capacitor C2.

Wherein, second current source A2, fourth switch S4 and sixth switch S6 are coupled in series between input terminal vcc and duplicate terminal syn'. Third resistor R3 and fifth switch S5 are coupled in series between duplicate terminal syn' and ground gnd. Third capacitor C3 is coupled between duplicate terminal syn' and ground gnd. Second resistor R2 is coupled between duplicate terminal syn' and average output terminal avg. Second capacitor C2 is coupled between average output terminal avg and ground gnd.

Fourth switch S4 and fifth switch S5 are controlled by mode signal STDBY which are both on in the first mode and both off in the second mode. Sixth switch S6 is controlled by a signal synchronous with the switching control signal.

Error amplifier 221c has two input terminals coupled respectively with synchronous terminal syn and average output terminal avg and is configured to generate ripple voltage Vr in accordance with difference Vsyn-Vavg between input voltages. It is to be understood that ripple voltage Vr varies with the inductor current as first synchronous voltage Vsyn is synchronous therewith.

Error amplifier 221c can amplify the difference between first synchronous voltage Vsyn and average Vavg to obtain ripple voltage Vr with higher amplitude, which enables the control circuit to obtain enhanced stability and sensitivity and faster response to variations in the power stage.

As shown in FIG. 2A, error amplifier 221c comprises transconductance amplifier GM and resistor Rc. Transconductance amplifier GM has a non-inverting input terminal coupled with synchronous terminal syn and an inverting input terminal coupled with average output terminal avg, and outputs ripple current Ir=g(Vsyn-Vavg), wherein g refers to a transconductance coefficient. Ripple current Ir flows through resistor Rc to form ripple voltage Vr across resistor Rc.

It is to be understood by those skilled in the art that an operational amplifier or other circuits may be adopted as alternatives of transconductance amplifier GM and resistor Rc shown in FIG. 2A so long as a voltage representing a difference between input signals is generated.

In the circuit shown in FIG. 2A, in the first mode which is preferable a normal condition, first switch S1 and second switch S2 are both on, and third switch S3 switches with power switch PS1. When third switch S3 is on, first capacitor C1 is charged by first current source A1, which leads to rise in first synchronous voltage Vsyn on synchronous terminal syn. When third switch S3 is off, first capacitor C1 is discharged through first resistor R1, which leads to drop in first synchronous voltage Vsyn on synchronous terminal syn. Therefore, first synchronous voltage Vsyn varies with inductor current IL in the power stage synchronously.

Similarly, in the first mode, in second synchronous voltage generator 221b1 of average generator 221b shown in FIG. 2, fourth switch S4 and fifth switch S5 are both on, and sixth switch S6 switches with power switch PS1. When sixth switch S6 is on, third capacitor C3 is charged by second current source A2, which leads to rise in second synchronous voltage Vsyn' on duplicate terminal syn'. When sixth switch St2 is off, third capacitor C3 is discharged through third resistor R3, which leads to drop in second synchronous voltage Vsyn' on duplicate terminal syn'. Therefore, second synchronous voltage Vsyn' on duplicate terminal syn' rises with turning on of power switch PS1 and drops with turning off of power switch PS1, and has same waveform with that of first synchronous voltage Vsyn which is synchronous with inductor current IL in the power stage. It is to be understood by those skilled in the art that second synchronous voltage Vsyn' can be provided with the same waveform as that of first synchronous voltage Vsyn by a configuration in which second current source A2, third resistor R3, and third capacitor C3 have same or proportional parameter to that of first current source A1, first resistor R1, and first capacitor C1 respectively.

Filtering circuit 221b2 in average generator 221b composed of second resistor R2 and second capacitor C2 receives second synchronous voltage Vsyn' on duplicate terminal syn' and outputs average Vavg thereof on average output terminal avg. Because the waveform of second synchronous voltage Vsyn' is the same with that of first synchronous voltage Vsyn', average Vavg equals to the average of first synchronous voltage Vsyn.

Preferably, by setting parameters of first current source A1, second current source A2, first resistor R1, third resistor R3, first capacitor C1 and third capacitor C3, average Vavg can be configured to equal to kVout, i.e. average Vavg is proportional to output voltage Vout, wherein k preferably equals to 1.

As described, ripple generator 221 comprises error amplifier 221c which has input terminals receiving first synchronous voltage Vsyn and average Vavg equal to the average thereof respectively and outputs ripple voltage Vr representing a difference between both signals. Ripple voltage Vr is a voltage rising and dropping with switching of power switch PS1. Error amplifier 221c outputs a signal synchronous and in phase with inductor current IL, which can represent the state of the power stage and be applied to generate state signal Vst.

Error amplifier 221c can amplify the difference between first synchronous voltage Vsyn and average Vavg to obtain ripple voltage Vr with higher amplitude, which enables the control circuit to obtain enhanced stability and sensitivity and faster response to variations in the power stage.

In the second mode, first switch S1, second switch S2, fourth switch S4 and fifth switch S5 are all off. Then, power to synchronous terminal syn and average output terminal avg is cut off, and voltages on both terminals are supplied by capacitors coupled therewith which remains unchanged basically with respect to the voltage level thereof at the moment of switching from the first mode to the second mode. Because first switch S1, second switch S2, fourth switch S4 and fifth switch S5 are all off, there is no discharge path to the ground for the capacitors, and variations of voltages on both terminals are impeded. Therefore, in the second mode, difference Vsyn-Vavg between the input voltages of error amplifier 221c is maintained at a substantially constant level which is equal to value of the difference at the moment of switching. It is to be noted that because second resistor R2 provides a current path between terminal syn' and average output terminal avg, average Vavg on average output terminal avg may fluctuate within a narrow range due to the difference between both voltages. Therefore, ripple voltage Vr outputted by ripple generator 221c is maintained as substantially constant in the second mode. In this case, state detection circuit 223 generates state signal Vst in accordance with fluctuation of feedback voltage Vfb, however, a substantially constant ripple voltage Vr is retained approximately at its level at the moment of switching from the first mode to the second mode. The waveform of ripple voltage Vr in both modes generated by circuit shown in FIG. 2A is illustrated in FIG. 2C.

In this case, superimposing circuit 222 superimposes ripple voltage Vr and feedback voltage Vfb to output superposition Vfb1. Superposition Vfb1 equals to a sum of ripple voltage Vr and feedback voltage Vfb. As shown in FIG. 2A, superimposing circuit 222 may be a terminal couple to resistor Rc which is implemented with feedback voltage Vfb. It is to be understood by those skilled in the art that superimposing circuit 222 may adopt other circuits configured to superimpose voltages such as adder circuit.

State detection circuit 223 (shown as a comparator in FIG. 2A) compares superposition Vfb1 with reference voltage Vref to output state signal Vst.

Figure 2B:
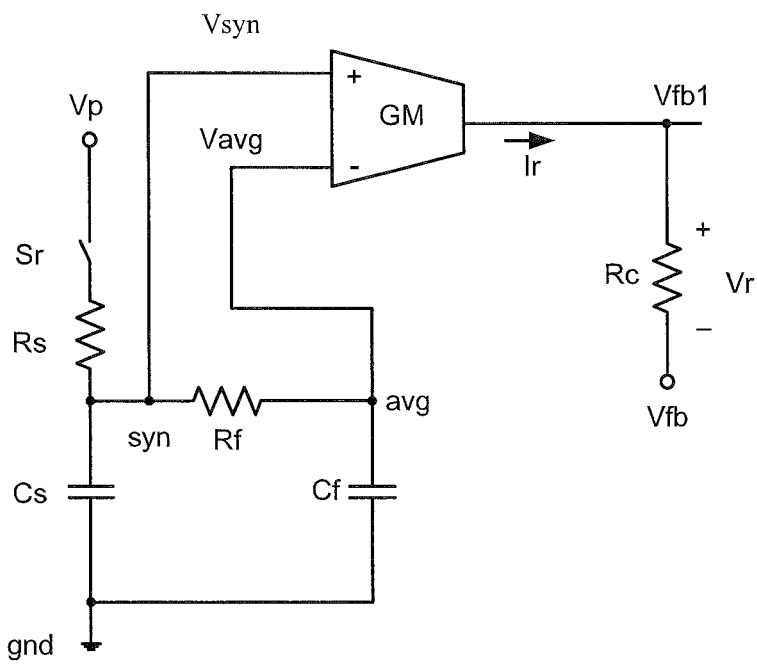
FIG. 2B is a schematic diagram of a ripple generator in a switching regulator in accordance with a comparative example in the prior art.
Figure 2C:
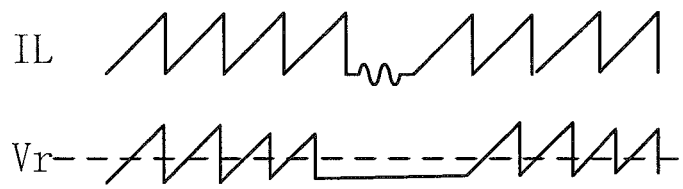
FIG. 2C is a waveform diagram showing a supplementary signal of the switching regulator in accordance with the second embodiment of the present disclosure.

In order to better understand various advantages of the present embodiment, a schematic diagram of a ripple generator in a switching regulator in accordance with a comparative example in the prior art is shown in FIG. 2B. As shown in FIG. 2B, the ripple generator comprises resistor Rs, capacitor Cs, switch Sr, resistor Rf, capacitor Cf and an error amplifier. Wherein, resistor Rs and switch Sr are coupled in series between a phase node of the power stage and synchronous terminal syn. Capacitor Cs is coupled between synchronous terminal syn and ground gnd. Resistor Rf is coupled between terminal syn and average output terminal avg. Capacitor Cf is coupled between average output terminal avg and ground gnd. Error amplifier has input terminals coupled with synchronous terminal syn and average output terminal avg respectively and outputs a ripple voltage representing a difference between both signals. Switch Sr is on in a normal condition (i.e. the first mode) and off in a light loaded or unloaded condition (i.e. the second mode). In the present disclosure, a phase node in a power stage refers to a node in a switching regulator on which a voltage reverses polarity in accordance with on and off of a power switch, wherein, in a buck topology, the phase node is the common node of the power switch and the rectifying element.

In the first mode, voltage Vp on the phase node reverses polarity with switching of power switch PS1 which charges and discharges capacitor Cs through resistor Rs. Thus, a voltage on terminal syn varies linearly which is synchronous voltage Vsyn rising and dropping with switching of power switch PS1. After filtering synchronous voltage Vsyn by filtering circuit composed of resistor Rf and capacitor Rf, average Vavg of synchronous voltage Vsyn is obtained.

Figure 2D:
FIG. 2D is a waveform diagram showing a supplementary signal in the switching regulator in accordance with the comparative example in the prior art.

In the second mode, switch Sr is off so that power to synchronous terminal syn and average output terminal avg is cut off, and voltages on both terminals are supplied by capacitors coupled therewith. Because resistor Rf provides a current path between terminal syn and average output terminal avg, average Vavg and synchronous voltage Vsyn change in opposite direction in the second mode until they equal to each other. This results in that the difference between both voltages is 0, so that ripple voltage Vr changes to 0 as shown in FIG. 2D. Ripple voltage Vr at a zero level leads to that there is required multiple cycles to recover a steady state when switching from the second mode to the first mode. Thus, there are greater ripples in the output of the power stage after switching.

In opposite, the control circuit in accordance with the present embodiment has a configuration of generating first synchronous voltage and average voltage in circuits separate from each other, and the synchronous terminal and the average output terminal are keep isolated under any circumstance.

In the second mode, a difference between voltages on the synchronous terminal and the average output terminal is maintained as substantially unchanged or varies a little. Therefore, in the second mode, the ripple voltage is maintained as a substantially constant level equal to the level at the moment of switching from the first mode to the second mode so that a steady status can be achieved quickly, and ripples in the output voltage are restrained.

Figure 3:
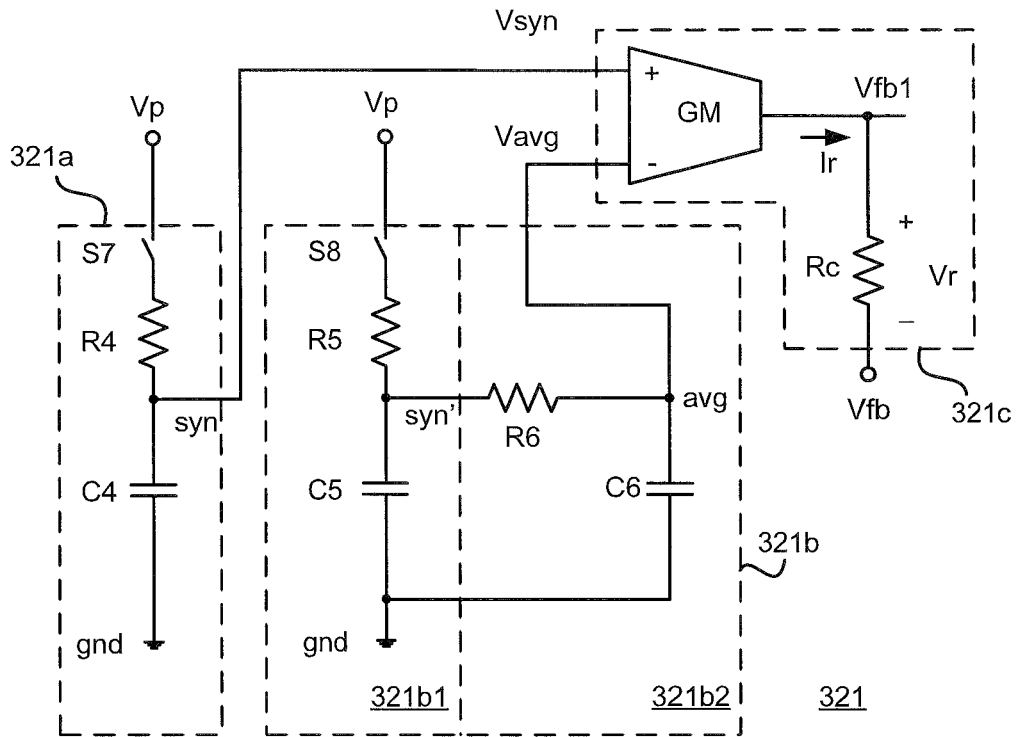
FIG. 3 is a schematic diagram of a ripple generator of a switching regulator in accordance with a third embodiment of the present disclosure.

FIG. 3 is a schematic diagram of a ripple generator of a switching regulator in accordance with a third embodiment of the present disclosure. Except for the ripple generator, the switching regulator in accordance with the third embodiment is the same with that in accordance with the second embodiment.

In the present embodiment, ripple generator 321 comprises first synchronous voltage generator 321a, average generator 321b and error amplifier 321c.

First synchronous voltage generator 321a is configured to generate first synchronous voltage Vsyn synchronous with the inductor current in the power stage in the first mode, and to maintain a voltage at synchronous terminal syn, i.e. to maintain first synchronous voltage Vsyn basically unchanged in the second mode at the level thereof at the moment of switching from the first mode to the second mode.

As shown in FIG. 2A, ripple generator 221 generates ripple voltage Vr in accordance with a signal synchronous with the switching control signal. In the present embodiment, as shown in FIG. 3, ripple generator 321 generates ripple voltage Vr in accordance with a phase node voltage of the power stage.

Average generator 321b is configured to generate average Vavg of the first synchronous voltage in the first mode, and to impede a voltage on an average output terminal from deviating, i.e. to maintain the voltage on the average output terminal substantially unchanged.

Error amplifier 321c has two input terminals coupled respectively with synchronous terminal syn and average output terminal avg and is configured to generate ripple voltage Vr in accordance with difference Vsyn-Vavg between input voltages.

First synchronous voltage generator 321a comprises fourth resistor R4, fourth capacitor C4 and seventh switch S7.

Fourth resistor R4 and seventh switch S7 are coupled in series between the phase node and synchronous terminal syn. Fourth capacitor C4 is coupled between synchronous terminal syn and ground gnd.

More specifically, average generator 321b comprises second synchronous voltage generator 321b1 and filtering circuit 321b2, wherein, second synchronous voltage generator 321b1 is the same with first synchronous voltage generator 321a and is configured to generate second synchronous voltage Vsyn' same as first synchronous voltage Vsyn. Filtering circuit 321b2 is coupled to duplicate terminal syn' and configured to output average Vavg of second synchronous voltage Vsyn'.

Second synchronous voltage generator 321b1 comprises fifth resistor R5, fifth capacitor C5 and eighth switch S8. Filtering circuit 321b2 comprises sixth resistor R6 and sixth capacitor C6.

Fifth resistor R5 and eighth switch S8 are coupled in series between the phase node and duplicate terminal syn'. Fifth resistor C3' is coupled between duplicate terminal syn' and ground gnd. Sixth resistor R6 is coupled between duplicate terminal syn' and average output terminal avg. Sixth capacitor C6 is coupled between average output terminal avg and ground gnd.

Seventh switch S3 and eighth switch S3' are controlled by a mode signal to be both on in the first mode and both off in the second mode.

It is similar to the second embodiment in that seventh switch S3 and eighth switch S3' are both on in the first mode, and voltage Vsyn on terminal syn has same waveform with voltage Vsyn' on terminal syn'. Thus, average Vavg on average output terminal avg which is an average of second synchronous voltage Vsyn' equals to the average of first synchronous voltage Vsyn. First synchronous voltage Vsyn and average Vavg are implemented to error amplifier 321c which generates ripple voltage Vr in accordance with a difference between both input signals. It is to be understood that ripple voltage Vr varies with the inductor current as first synchronous voltage Vsyn is synchronous therewith.

Error amplifier 321c may amplify the difference between first synchronous voltage Vsyn and average Vavg to obtain ripple voltage Vr with a higher amplitude, which enables the control circuit to obtain enhanced stability and sensitivity and faster response to variations in the power stage.

The present embodiment is different from the second embodiment in that first synchronous voltage generator 321a generates first synchronous voltage generator 321a varying with inductor current IL in accordance with phase node voltage Vp of the power stage. More specifically, phase node voltage Vp reverses polarity with switching of power switch PS1, so that fourth capacitor C4 is charged and discharged through fourth resistor R4 by phase node voltage Vp. Thus, the voltage on synchronous terminal syn varies linearly, and first synchronous voltage Vsyn synchronous with inductor current IL is generated.

In the second mode, as similar to the second embodiment, seventh switch S7 and eighth switch S8 are both off to stop powering synchronous terminal syn and average output terminal avg. The voltages on both terminals are supplied by capacitors coupled therewith, wherein first synchronous voltage Vsyn on synchronous terminal syn is maintained unchanged. Meanwhile, average Vavg on average output terminal avg is maintained as substantially constant. It is to be noted that because fifth resistor R4 provides a current path between duplicate terminal syn' and average output terminal avg, average Vavg on average output terminal avg may fluctuate within a narrow range due to the difference between both voltages. Therefore, the difference between both signals is maintained as substantially constant, which leads to a basically constant ripple voltage Vr.

In this case, state detection circuit 221 generates state signal Vst in accordance with fluctuation of feedback voltage Vfb, however, a substantially constant ripple voltage Vr is retained approximately at the level thereof at the moment of switching from the first mode to the second mode. Therefore, in the second mode, the ripple voltage is maintained as a substantially constant level equal to its level at the moment of switching from the first mode to the second mode so that a steady status can be achieved quickly, and ripples in the output voltage are restrained.

In the present embodiment, synchronous voltages are generated in accordance with a phase node voltage of the power stage, which can reduce elements in the ripple generator and achieve advantages of less elements and compact circuit.

Figure 4:
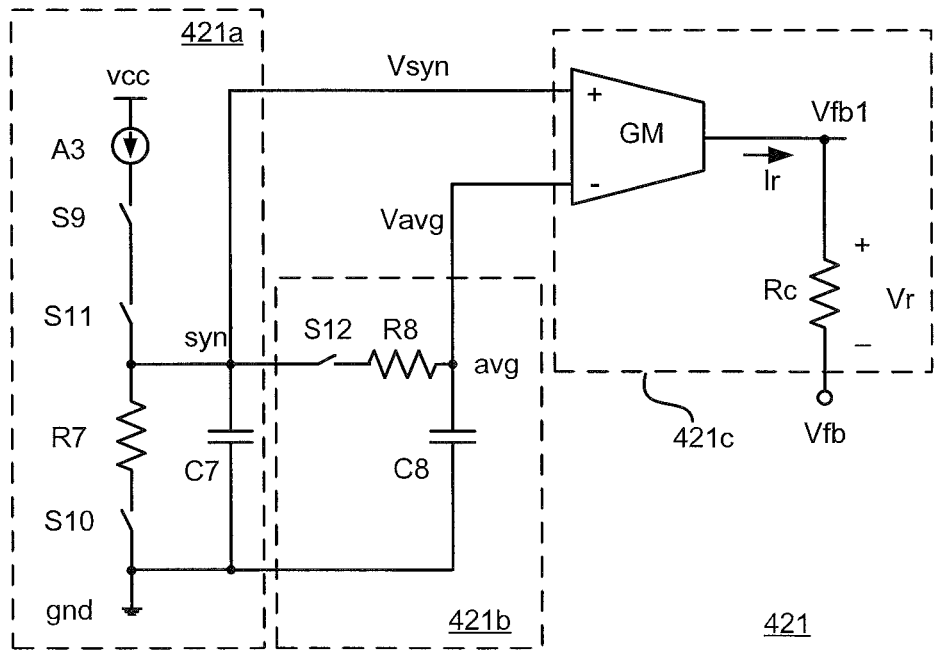
FIG. 4 is a schematic diagram of a ripple generator of a switching regulator in accordance with a fourth embodiment of the present disclosure.

FIG. 4 is a schematic diagram of a ripple generator of a switching regulator in accordance with a fourth embodiment of the present disclosure. Except for the ripple generator, the switching regulator in accordance with the fourth embodiment is the same with that in accordance with the second embodiment.

In the present embodiment, ripple generator 421 comprises first synchronous voltage generator 421a, average generator 421b and error amplifier 421c.

First synchronous voltage generator 421a, average generator 421b and error amplifier 421c have the same function with their correspondence in the second embodiment, which would not describe hereinafter.

First synchronous voltage generator 421a comprises third current source A3, ninth switch S9, tenth switch S9, seventh resistor R7, seventh capacitor C7 and eleventh switch S11.

Wherein, third current source A3, ninth switch S9 and eleventh switch S11 are coupled in series between input terminal vcc and ground gnd. Seventh resistor R7 and tenth switch S10 are coupled in series between synchronous terminal syn and ground gnd. Seventh capacitor C7 is coupled between synchronous terminal syn and ground gnd. It is obvious that first synchronous voltage generator 421a is same as first synchronous voltage generator 221a in the second embodiment.

The present embodiment is different from the second embodiment in that average generator 421b comprises a filtering circuit and twelfth switch S12 coupled between synchronous terminal syn and the filtering circuit. More specifically, the filtering circuit comprises eighth resistor R8 and eighth capacitor C8.

In average generator 421b, twelfth switch S12 and eighth resistor R8 are coupled in series between synchronous terminal syn and average output terminal avg. Eighth capacitor C8 is coupled between average output terminal avg and ground gnd.

Ninth switch S9, tenth switch S10 and twelfth switch S12 are controlled by a mode signal STDBY to be turned on in the first mode and turned off in the second mode. Eleventh switch S11 is controlled by a signal synchronous with the switching control signal.

As shown in FIG. 4, transconductance amplifier GM in error amplifier 421c has a non-inverting input terminal coupled with synchronous terminal syn and an inverting input terminal coupled with average output terminal avg. Error amplifier 421c is configured to output ripple voltage Vr in accordance with difference Vsyn-Vavg between input terminals. It is to be understood that ripple voltage Vr varies with the inductor current as first synchronous voltage Vsyn is synchronous therewith.

Error amplifier 421c may amplify the difference between first synchronous voltage Vsyn and average Vavg to obtain ripple voltage Vr with higher amplitude, which enables the control circuit to obtain enhanced stability and sensitivity and faster response to variations in the power stage.

In the present embodiment, average generator 421b is coupled with synchronous terminal syn. Controlled by twelfth switch S12, in the first mode, average generator 421b outputs average Vavg of first synchronous voltage Vsyn through the filtering circuit composed of eighth resistor R8 and eighth capacitor C8. In the second mode, because twelfth switch S12 is off, synchronous terminal syn and average output terminal avg are isolated from each other, and voltages on both terminals are supplied by capacitors coupled therewith. Thus, when the power stage switches from the second mode to the first mode, ripple generator Vr is retained the state of the moment of switching to the second mode. Thus, a steady status can be achieved quickly, and ripples in the output voltage are restrained.

The control circuit in accordance with the present embodiment has a compact structure and a reduced number of elements. When fabricated into an integrated circuit, advantages of less devices and compact layout may be obtained.

Figure 5:
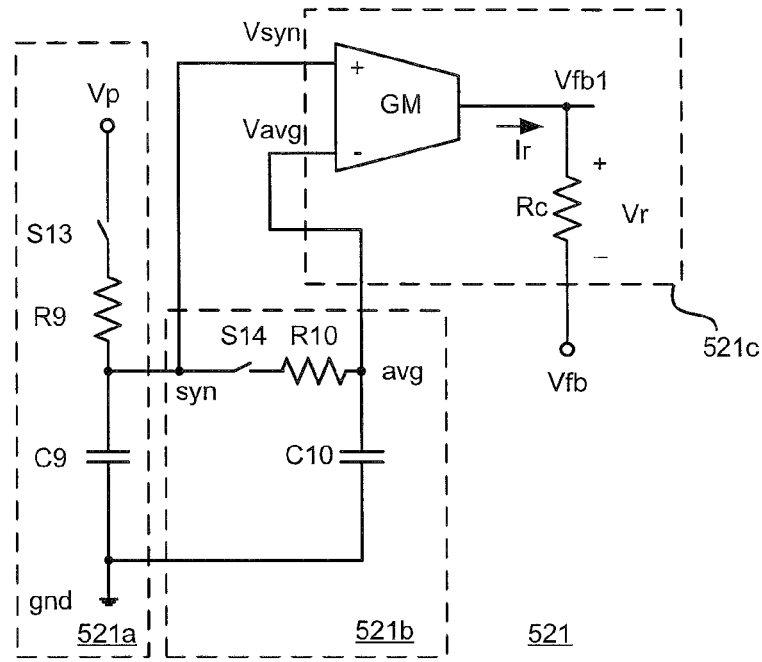
FIG. 5 is a schematic diagram of a ripple generator of a switching regulator in accordance with a fifth embodiment of the present disclosure.

FIG. 5 is a schematic diagram of a ripple generator of a switching regulator in accordance with a fifth embodiment of the present disclosure. Except for the ripple generator, the switching regulator in accordance with the fifth embodiment is basically the same with that in accordance with the second embodiment.

In the present embodiment, ripple generator 521 comprises first synchronous voltage generator 521a, average generator 521b and error amplifier 521c.

First synchronous voltage generator 521a, average generator 521b and error amplifier 521c have the same function with their correspondence in the second embodiment, which may not describe hereinafter.

First synchronous voltage generator 521a comprises ninth resistor R3, ninth capacitor C3 and thirteenth switch S3.

Ninth resistor R9 and thirteenth switch S13 are coupled in series between a phase node of a power stage and synchronous terminal syn. Ninth capacitor C9 is coupled between synchronous terminal syn and ground gnd.

Average generator 521b comprises a filtering circuit and fourteenth switch S14 coupled between synchronous terminal syn and the filtering circuit. The filtering circuit comprises tenth resistor R10 and tenth capacitor C10. Fourteenth switch S14 and tenth resistor R10 are coupled in series between synchronous terminal syn and average output terminal avg. Tenth capacitor C4 is coupled between average output terminal avg and ground gnd.

Wherein, thirteenth switch S3 and fourteenth switch S4 are controlled by mode signal STDBY which are both on in the first mode and both off in the second mode.

In the present embodiment, average generator 521b is coupled with synchronous terminal syn of first synchronous generator 521a. Controlled by fourteenth switch S4, in the first mode, average generator 521b outputs average Vavg of first synchronous voltage Vsyn through a filtering circuit composed of tenth resistor R4 and tenth capacitor C4. In the second mode, because thirteenth switch S3 and fourteenth switch S4 are off, synchronous terminal syn and average output terminal avg are isolated with each other, and voltages on both terminals are supplies by capacitors coupled therewith. Therefore, in the second mode, the ripple voltage is maintained as a substantially constant level equal to its level at the moment of switching from the first mode to the second mode so that a steady status can be achieved quickly, and ripples in the output voltage are restrained.

The control circuit in accordance with the present embodiment has a compact structure and a reduced number of elements. When fabricated into an integrated circuit, advantages of less devices and compact layout may be obtained.

Figure 6:
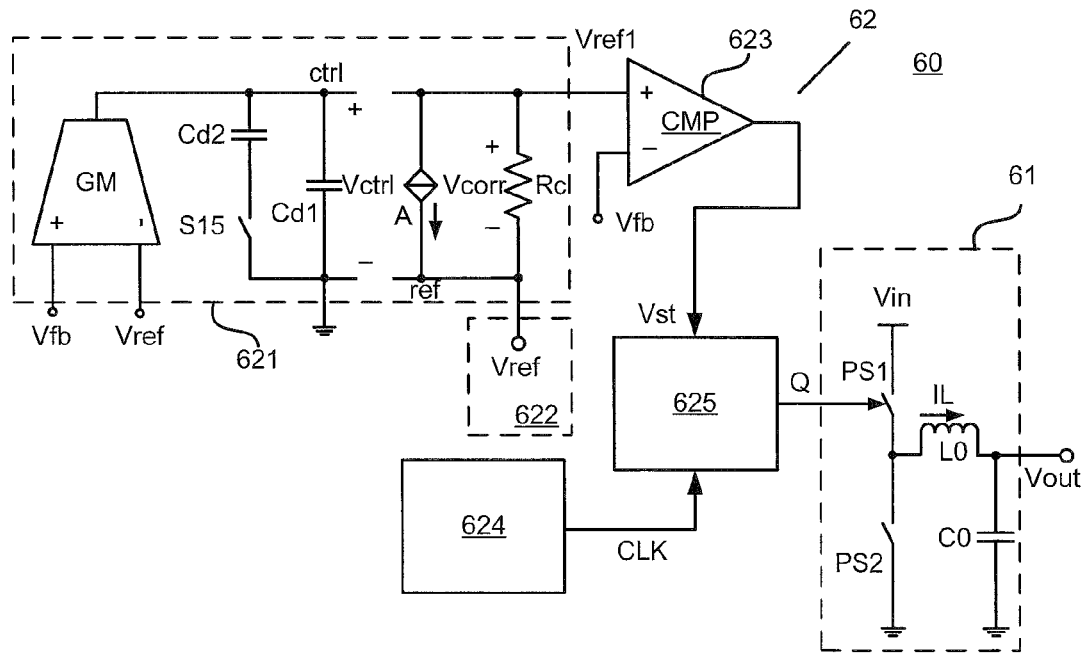
FIG. 6 is a schematic diagram of a switching regulator in accordance with a sixth embodiment of the present disclosure.

FIG. 6 is a schematic diagram of a switching regulator in accordance with a sixth embodiment of the present disclosure. As shown in FIG. 6, switching regulator 60 comprises power stage 61 and control circuit 62. Wherein, power stage 61 is substantially the same as the power stage shown in FIG. 1A, and will not be illustrated hereinafter. It is to be understood by those skilled in the art that power stage 61 may adopt other well-known circuit topologies such as a boost topology and a buck-boost topology as necessary.

Control circuit 62 comprises supplementary signal generator 621, superimposing circuit 622, state detection circuit 623, clock generator 624 and switching control signal generator 625.

In the present embodiment, first signal V1 is reference voltage Vref, and second signal V2 is feedback voltage Vfb. Wherein the supplementary signal comprises correction voltage Vcorr. Correction voltage Vcorr is configured to correct or compensate reference voltage Vref so that a reference voltage varying with the state of the power stage is generated by the control circuit, which enables the control circuit to obtain enhanced stability and sensitivity and faster response to variations in the power stage. When generating the state signal, supplementary signal ΔV is superimposed, and the power switch is triggered on or off when Vfb+ΔV=Vref, so as to enable the circuit to have faster response. In this case, ripple voltage Vr as described in abovementioned embodiments is superimposed to the feedback voltage. Another choice is to correct or compensate reference Vref to render the voltage inputted to state detection circuit 623 a fluctuation with respect to the predetermined value.

In the present embodiment, faster response is obtained when the switching regulator switching from a light loaded or unloaded condition to a normal condition by means of implementing different operation to the correction voltage in different mode.

In the present embodiment, supplementary signal generator 621 is correction voltage generator 621 configured to generate correction voltage Vcorr.

Correction voltage generator 621 is configured to generate correction voltage Vcorr varying with a difference between feedback voltage Vfb and reference voltage Vref with a first delay (i.e. correction voltage Vcorr varying with the difference at a first rate) in a first mode, and to generate correction voltage Vcorr varying with the difference with a second delay (i.e. correction voltage Vcorr varying with the difference at a second rate) in a second mode. Wherein the second delay is greater than the first delay (i.e. the second rate is less than the first rate).

The first delay is configured as such a small value that correction voltage Vcorr can respond to the feedback voltage quickly in the first mode. The second delay is configured considerably greater than the first delay so that correction voltage Vcorr varies in a very slow rate in the second mode, and changes in correction voltage Vcorr is impeded.

Superimposing circuit 622 is configured to superimpose correction voltage Vcorr and reference voltage Vref to generate superposition Vref1.

State detection circuit 623 is configured to generate state signal Vst in accordance with feedback voltage Vfb and superposition Vref1.

Clock generator 624 is configured to generate clock signal CLK.

Switching control signal generator 625 is configured to generate switching control signal Q for controlling power switch PS1 in power stage 61 in accordance with state signal Vst and clock signal CLK.

As shown in FIG. 6, in the first mode, correction voltage generator 621 generates correction voltage Vcorr varying with a difference between feedback voltage Vfb and reference voltage Vref with the first delay, therefore, superposition Vref1 varies with Vfb quickly.

In the second mode, correction voltage generator 621 generates correction voltage Vcorr varying with the difference with the second delay. By configuring the second delay considerably greater than the first delay, correction voltage Vcorr changes at a very slow rate in the second mode, and changes in correction voltage Vcorr with respect to the level thereof at the moment of switching from the first mode to the second mode is impeded. In other words, correction voltage Vcorr is maintain substantially unchanged in the second mode, which also maintains supplementary signal ΔV unchanged.

Therefore, when the power stage switches from the second mode to the first mode, the power stage can recover a steady state quickly because the correction voltage is maintained approximately as the level when switching from the first mode to the second mode.

Preferably, correction voltage generator 621 comprises transconductance amplifier GM, eleventh capacitor Cd1, twelfth capacitor Cd2, fifteenth switch S5, voltage-controlled current source A and resistor Rc.

Transconductance amplifier GM has input terminals receiving feedback voltage Vfb and reference voltage Vref. Feedback voltage Vfb is implemented to a non-inverting input terminal, and reference voltage Vref is implemented to an inverting input terminal. An output terminal of transconductance amplifier GM is coupled to control terminal ctrl.

Twelfth capacitor Cd2 and fifteenth switch S5 are coupled in series between control terminal ctrl and a ground. Eleventh capacitor Cd1 is coupled between control terminal ctrl and the ground.

Voltage-controlled current source A outputs a voltage-controlled current representing an output voltage of the power stage to resistor Rc in accordance with the voltage on control terminal ctrl.

A current loop is formed by resistor Rc and voltage-controlled current source A, and resistor Rc generates correction voltage Vcorr in accordance with the voltage-controlled current outputted by voltage-controlled current source A.

Fifteenth switch S15 is controlled by mode signal STDBY to be on in the first mode and off in the second mode. The capacitance of the twelfth capacitor is greater than that of the eleventh capacitor.

In the abovementioned preferable correction voltage generator 621, since fifteenth switch S15 is off in the first mode, the capacitance between control terminal ctrl and the ground equals to that of eleventh capacitor Cd1. Because eleventh capacitor Cd1 is configured with a small capacitance, a small variation in current can cause considerable variation in voltage across the capacitor, i.e. there is a small delay. Thus, voltage Vctrl across the capacitor varies with the difference between feedback voltage Vfb and reference voltage Vref in a small first delay. Because the current generated by voltage-controlled current source A is determined by voltage Vctrl on the control terminal, the current generated by voltage-controlled current source A varies with the difference between feedback voltage Vfb and reference voltage Vref with the first delay. Thus, correction voltage Vcorr varies with the difference with the first delay. Meanwhile, the transconductance amplifier amplifies variations in feedback voltage Vfb with respect to reference voltage Vref, which enables the control circuit to obtain enhanced stability and sensitivity and faster response to variations in the power stage.

In the second mode, as turning on of fifteenth switch S15, the capacitance between control terminal ctrl and ground equals to a sum of the capacitance of eleventh capacitor Cd1 and the capacitance of twelfth capacitor Cd2. Because the capacitance of twelfth capacitor Cd2 is considerably greater than that of eleventh capacitor Cd1, a small variation in current cannot cause considerable variation in voltage across the capacitor. Voltage Vctrl between control terminal ctrl and the ground varies in a slow rate. Thus, variation of correction voltage Vcorr slows down and stays unchanged with respect of the level thereof at the moment of switching from the first mode to the second mode. The greater capacitance of twelfth capacitor Cd2, the lower rate of variation of correction voltage Vcorr in the second mode. Therefore, in the second mode, the difference between input terminals of state detection circuit 623 is maintained as substantially unchanged at the level thereof at the moment of switching into the second mode, so that when switching from the second mode to the first mode, a steady status can be achieved quickly, and ripples in the output voltage are restrained.

Figure 7:
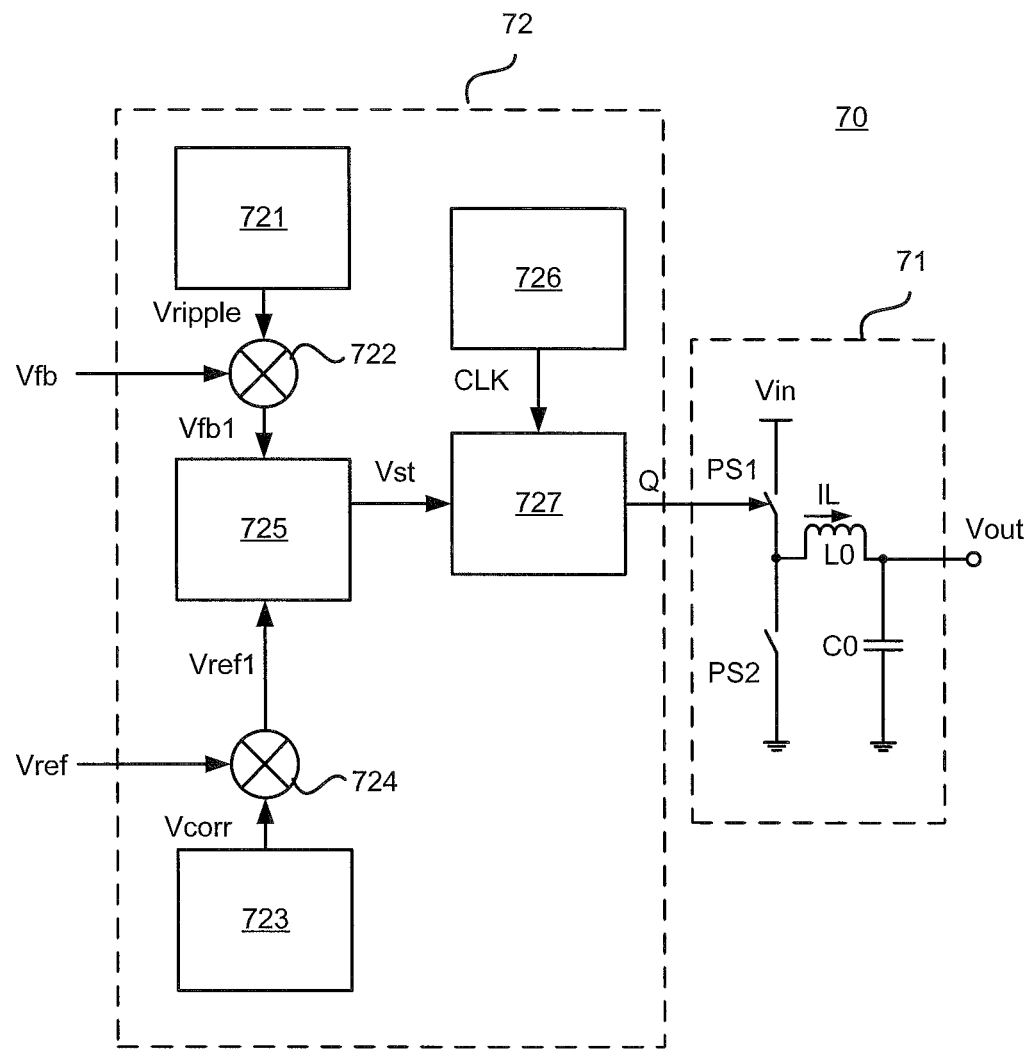
FIG. 7 is a schematic diagram of a switching regulator in accordance with a sixth embodiment of the present disclosure.

FIG. 7 is a schematic diagram of a switching regulator in accordance with a seventh embodiment of the present disclosure. As shown in FIG. 7, switching regulator 70 comprises power stage 71 and control circuit 72. Wherein, the structure of power stage 71 is substantially the same as that shown in FIG. 1A, and will not be illustrated herein. It is to be understood by those skilled in the art that power stage 71 may adopt other well-known circuit topologies such as a boost topology and a buck-boost topology as necessary.

Control circuit 72 comprises ripple generator 721, first superimposing circuit 722, correction voltage generator 723, second superimposing circuit 724, state detection circuit 725, clock signal generator 726 and switching control signal generator 727.

Ripple generator 721 is configured to generate ripple voltage Vr synchronous with an inductor current of the power stage in accordance with a signal synchronous with switching control signal Q (which is preferably a feedback switching control signal) in the first mode, and to impede ripple voltage Vr in the second mode from deviating from the value thereof at the moment of switching from the first mode to the second mode. In other words, ripple voltage Vr is maintained substantially unchanged with respect to the value when switching from the first mode to the second mode.

Wherein, the first mode is a normal condition of the power stage in which power stage 71 is controlled by control circuit 72 to output a substantially constant output voltage Vout.

The second mode is a light loaded, unloaded or large capacitance loaded condition which may be indicated by mode signal STDBY.

Ripple generator 721 may adopt any one of the ripple generators described in the second to fifth embodiments.

First superimposing circuit 722 is configured to superimpose ripple voltage Vr with feedback voltage Vfb to generate first superposition Vfb1. First superposition Vfb1 equals to a sum of ripple voltage Vr with feedback voltage Vfb. First superimposing circuit 722 may adopt any one of the superimposing circuits described in the second to fifth embodiments.

Correction voltage generator 723 may adopt circuit in the prior art, or the circuit describe in the sixth embodiment. When adopting the circuit in the sixth embodiment, correction voltage generator 721 is configured to generate correction voltage Vcorr varying with a difference between feedback voltage Vfb and reference voltage Vref with the first delay (i.e. correction voltage Vcorr varying with the difference at the first rate) in the first mode, and to generate correction voltage Vcorr varying with the difference with the second delay (i.e. correction voltage Vcorr varying with the difference at the second rate) in the second mode. Wherein the second delay is greater than the first delay (i.e. the second rate is less than the first rate).

The first delay is configured as such a small value that correction voltage Vcorr can respond to the feedback voltage quickly in the first mode. The second delay is configured considerably greater than the first delay so that correction voltage Vcorr varies in a very slow rate in the second mode, and changes in correction voltage Vcorr is impeded.

Second superimposing circuit 724 is configured to superimposing correction voltage Vcorr and reference voltage Vref to generate second superposition Vref1.

State detection circuit 725 is configured to generate state signal Vst in accordance with first superposition Vfb1 and second superposition Vref1.

Clock generator 726 is configured to generate clock signal CLK.

Switching control signal generator 727 is configured to generate switching control signal Q for controlling power switch PS1 in power stage 71 in accordance with state signal Vst and clock signal CLK.

In the present embodiment, a ripple voltage is superimposed to a feedback voltage, and a first synchronous voltage generator is configured separate from an average generator, so that a synchronous terminal and an average output terminal are isolated from each other. Thus, in a second mode, a difference between the synchronous terminal and the average output terminal is maintained unchanged. Therefore, the difference is substantially constant so that the ripple voltage is maintained approximately at the level thereof at the moment of switching to the second mode. Meanwhile, a correction voltage is superimposed to a reference voltage for correction, and the correction voltage is made vary in different delay in different modes, so that the correction voltage can be maintained approximately at the level thereof at the moment of switching to the second mode. Therefore, the power stage of the switching regulator in accordance the present embodiment can recover a steady state quickly.

Figure 8:
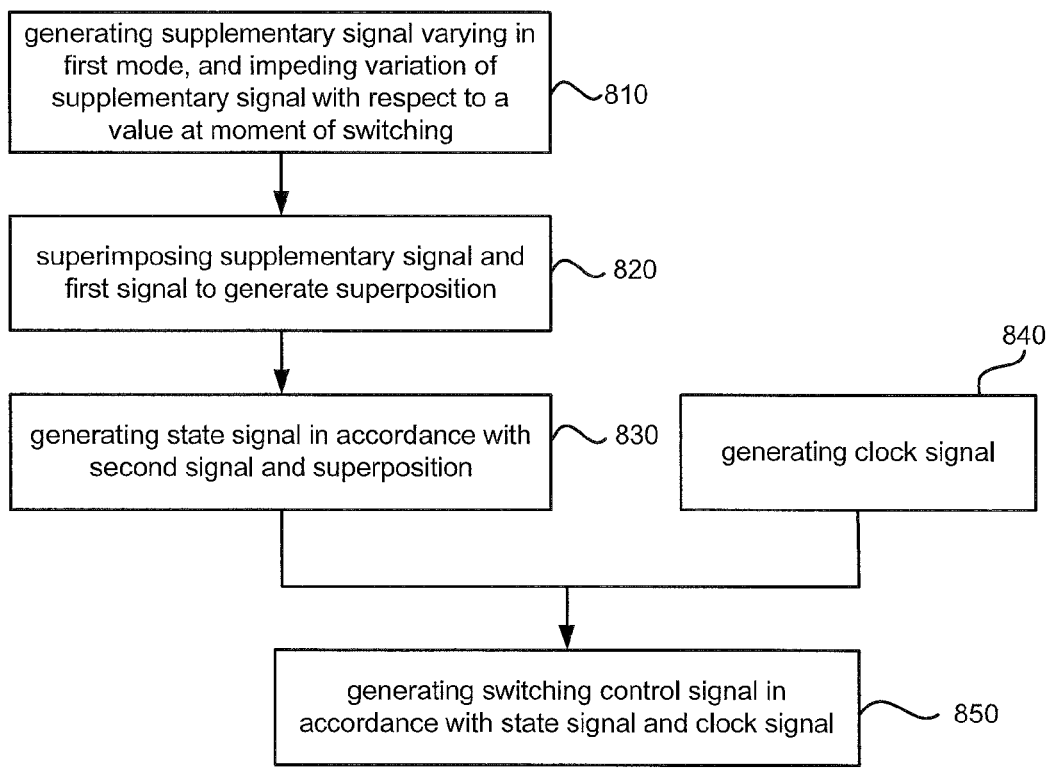
FIG. 8 is a flow chart of a control method for a switching regulator in accordance with a seventh embodiment of the present disclosure.

FIG. 8 is a flow chart of a method for controlling a switching regulator in accordance with an eighth embodiment of the present disclosure. As shown in FIG. 8, the method comprises:

Step 810. a supplementary signal varying with a state parameter of a power stage is generated in a first mode, and in a second mode a variation of the supplementary signal is impeded with respect to a value thereof at the moment of switching from the first mode to the second mode.

Step 820. the supplementary signal and a first signal are superimposed to generate a superposition.

Step 830. a state signal is generated in accordance with a second signal and the superposition.

Step 840. a clock signal is generated.

Step 850. a switching control signal is generated in accordance with the state signal and the clock signal to control a power switch in the power stage.

Wherein steps 810-830 are implemented simultaneously with step 840.

In a preferable implementation, the supplementary signal is a ripple voltage, and the state parameter of the power stage is a phase node voltage or the switching control signal. The first signal is a feedback voltage, and the second signal is a reference voltage.

Wherein step 810 comprises generating a ripple voltage synchronous with an inductor current of the power stage in accordance with a synchronous voltage on a synchronous terminal and an average thereof on an average output terminal in the first mode, and maintaining the synchronous terminal and average output terminal isolated from each other in the second mode.

In another preferable implementation, supplementary signal is a correction voltage for compensating the reference voltage. The state parameter of the power stage is the feedback voltage. The first signal is a feedback voltage, and the second signal is a reference voltage.

Wherein step 810 comprises generating a correction voltage varying with a difference between the feedback voltage and the reference voltage at a first rate in the first mode and generating a correction voltage varying with the difference at a second rate which is lower than the first rate in the second mode.

In the present embodiment, the control circuit generates a supplementary signal varying with a state parameter of the power stage in a first mode and keeps the supplementary signal substantially unchanged in a second mode with respect to the value thereof at the moment of switching from the first mode to the second mode so that the supplementary signal is maintained substantially constant since the moment of mode switching, therefore, a steady state can be achieved quickly, and ripples in the output voltage are restrained.

The foregoing description describes specific embodiments of the present invention. However, they have been presented for purposes of illustration and description. It is intended that the scope of the invention be defined by the claims appended hereto and their equivalents. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

I claim:

1. A control circuit for controlling a switching regulator, comprising:
    a supplementary signal generator configured to generate a supplementary signal;
    a superimposing circuit configured to superimpose said supplementary signal with a first signal to generate a superposition;
    a state detection circuit configured to generate a state signal in accordance with a second signal and said superposition;
    a clock generator configured to generate a clock signal; and
    a switching control signal generator configured to generate a switching control signal in accordance with said state signal and said clock signal;
    wherein said supplementary signal generator is configured to generate said supplementary signal varying with a state parameter of a power stage in a first mode and to impede said supplementary signal from deviating from a value thereof at the moment of switching from said first mode to said second mode.

2. The control circuit according to claim 1, wherein, said first signal is a feedback voltage, and said second signal is a reference voltage, and said supplementary signal comprises a ripple voltage;
    wherein said ripple generator is configured to generate said ripple voltage synchronous with an inductor current of said power stage in said first mode, and to impede said ripple voltage from deviating from a value thereof at the moment of switching from said first mode to said second mode in said second mode.

3. The control circuit according to claim 2, wherein, said ripple generator comprises:
    a first synchronous voltage generator configured to generate a first synchronous voltage synchronous with said inductor current in said first mode, and to maintain said first synchronous voltage unchanged in said second mode;
    an average generator configured to generate an average of said first synchronous voltage in said first mode and to keep an average output terminal and a synchronous terminal isolated from each other in said second mode; and
    an error amplifier with input terminals coupled with said average output terminal and said synchronous terminal respectively configured to generate said ripple voltage in accordance with a difference between input signals.

4. The control circuit according to claim 3, wherein, said average generator comprises:
 a second synchronous voltage generator with same circuitry as said first synchronous voltage generator configured to generate a second synchronous voltage same with said first synchronous voltage; and
 a filtering circuit coupled with said second synchronous voltage generator configured to generate an average of said second synchronous voltage.

5. The control circuit according to claim 4, wherein, said first synchronous voltage generator comprises:
 a first current source, a first switch and a third switch coupled in series between an input terminal and said synchronous terminal;
 a first resistor and a second switch coupled between said synchronous terminal and a ground; and
 a first capacitor coupled between said synchronous terminal and said ground;
 wherein said second synchronous voltage generator comprises:
 a second current source, a fourth switch and a sixth switch coupled in series between said input terminal and a duplicate terminal;
 a third resistor and a fifth switch coupled between said duplicate terminal and said ground; and
 a third capacitor is coupled between said duplicate terminal and said ground;
 wherein said first switch, said second switch, said fourth switch, and said fifth switch are controlled by a mode signal to be turned on in said first mode and turned off in said second mode; and said third switch and said sixth switch are controlled by a signal synchronous with said switching control signal.

6. The control circuit according to claim 4, wherein, said first synchronous voltage generator comprises:
 a fourth resistor and a seventh switch coupled in series between a phase node of said power stage and said synchronous terminal; and
 a fourth capacitor is coupled between said synchronous terminal and said ground;
 wherein said second synchronous voltage generator comprises:
 a fifth resistor and an eighth switch coupled between said phase node and a duplicate terminal; and
 a fifth capacitor coupled between said duplicate terminal and said ground;
 wherein said seventh switch and said eighth switch are controlled by a mode signal to be turned on in said first mode and turned off in said second mode.

7. The control circuit according to claim 3, wherein, said average generator comprises:
 a filtering circuit; and
 a mode switch coupled between said synchronous terminal and said filtering circuit and controlled by a mode signal to be turned on in said first mode and turned off in said second mode.

8. The control circuit according to claim 1, wherein, said first signal is a reference voltage, and said second signal is a feedback voltage, and said supplementary signal comprises a correction voltage for compensating said reference voltage;
 wherein said correction voltage generator is configured to generate said correction voltage varying with a difference between said feedback voltage and said reference voltage with a first delay in said first mode, and generate said correction voltage varying with said difference with a second delay which is greater than said first delay in said second mode.

9. A ripple generator for a switching regulator, comprising:
 a first synchronous voltage generator configured to generate a first synchronous voltage synchronous with an inductor current in a first mode, and to maintain said first synchronous voltage unchanged in a second mode;
 an average generator configured to generate an average of said first synchronous voltage in said first mode and to keep an average output terminal and a synchronous terminal isolated from each other in said second mode; and
 an error amplifier with input terminals coupled with said average output terminal and said synchronous terminal respectively configured to generate said ripple voltage in accordance with a difference between input signals.

10. The ripple generator according to claim 9, wherein, said average generator comprises:
 a second synchronous voltage generator with same circuitry as said first synchronous voltage generator configured to generate a second synchronous voltage same with said first synchronous voltage; and
 a filtering circuit coupled with said second synchronous voltage generator configured to generate an average of said second synchronous voltage.

11. The control circuit according to claim 10, wherein, said correction voltage generator comprises:
 a transconductance amplifier with a non-inverting input terminal receiving said feedback voltage, an inverting input terminal receiving said reference voltage and an output terminal coupled with a control terminal;
 a twelfth capacitor and a fifteenth switch coupled in series between said control terminal and a ground; and
 an eleventh capacitor coupled between said control terminal and said ground;
 a voltage-controlled current source controlled by a voltage on said control terminal;
 a resistor coupled with said voltage-controlled current source to form a current loop;
 wherein said fifteenth switch is controlled by said mode signal to be turned on in said first mode and turned off in said second mode; and a capacitance of said twelfth capacitor is greater than that of said eleventh capacitor.

12. The ripple generator according to claim 10, wherein, said first synchronous voltage generator comprises:
 a first current source, a first switch and a third switch coupled in series between an input terminal and said synchronous terminal;
 a first resistor and a second switch coupled between said synchronous terminal and a ground; and
 a first capacitor coupled between said synchronous terminal and said ground;
 wherein said second synchronous voltage generator comprises:
 a second current source, a fourth switch and a sixth switch coupled in series between said input terminal and a duplicate terminal;
 a third resistor and a fifth switch coupled between said duplicate terminal and said ground; and
 a third capacitor is coupled between said duplicate terminal and said ground;
 wherein said first switch, said second switch, said fourth switch, and said fifth switch are controlled by a mode signal to be turned on in said first mode and turned off in said second mode; and said third switch and said sixth switch are controlled by a signal synchronous with said switching control signal.

13. The ripple generator according to claim 10, wherein, said first synchronous voltage generator comprises:

a fourth resistor and a seventh switch coupled in series between a phase node of said power stage and said synchronous terminal; and a fourth capacitor is coupled between said synchronous terminal and said ground;

wherein said second synchronous voltage generator comprises:

a fifth resistor and an eighth switch coupled between said phase node and a duplicate terminal; and a fifth capacitor coupled between said duplicate terminal and said ground;

wherein said seventh switch and said eighth switch are controlled by a mode signal to be turned on in said first mode and turned off in said second mode.

14. The ripple generator according to claim 9, wherein, said average generator comprises:

a filtering circuit; and a mode switch coupled between said synchronous terminal and said filtering circuit and controlled by a mode signal to be turned on in said first mode and turned off in said second mode.

15. A switching regulator, comprising:

a power stage; and a control circuit, comprising:

a supplementary signal generator configured to generate a supplementary signal;

a superimposing circuit configured to superimpose said supplementary signal with a first signal to generate a superposition;

a state detection circuit configured to generate a state signal in accordance with a second signal and said superposition;

a clock generator configured to generate a clock signal; and a switching control signal generator configured to generate a switching control signal in accordance with said state signal and said clock signal;

wherein said supplementary signal generator is configured to generate said supplementary signal varying with a state parameter of a power stage in a first mode and to impede said supplementary signal from deviating from a value thereof at the moment of switching from said first mode to said second mode.

16. The switching regulator according to claim 15, wherein, said first signal is a feedback voltage, and said second signal is a reference voltage, and said supplementary signal comprises a ripple voltage;

wherein said ripple generator is configured to generate said ripple voltage synchronous with an inductor current of said power stage in said first mode, and to impede said ripple voltage from deviating from a value thereof at the moment of switching from said first mode to said second mode in said second mode.

17. The switching regulator according to claim 16, wherein, said ripple generator comprises:

a first synchronous voltage generator configured to generate a first synchronous voltage synchronous with said inductor current in said first mode, and to maintain said first synchronous voltage unchanged in said second mode;

an average generator configured to generate an average of said first synchronous voltage in said first mode and to keep an average output terminal and a synchronous terminal isolated from each other in said second mode; and an error amplifier with input terminals coupled with said average output terminal and said synchronous terminal respectively configured to generate said ripple voltage in accordance with a difference between input signals.

18. The switching regulator according to claim 17, wherein, said average generator comprises:

a second synchronous voltage generator with same circuitry as said first synchronous voltage generator configured to generate a second synchronous voltage same with said first synchronous voltage; and a filtering circuit coupled with said second synchronous voltage generator configured to generate an average of said second synchronous voltage.

19. The switching regulator according to claim 18, wherein, said first synchronous voltage generator comprises:

a first current source, a first switch and a third switch coupled in series between an input terminal and said synchronous terminal;

a first resistor and a second switch coupled between said synchronous terminal and a ground; and a first capacitor coupled between said synchronous terminal and said ground;

wherein said second synchronous voltage generator comprises:

a second current source, a fourth switch and a sixth switch coupled in series between said input terminal and a duplicate terminal;

a third resistor and a fifth switch coupled between said duplicate terminal and said ground; and a third capacitor is coupled between said duplicate terminal and said ground;

wherein said first switch, said second switch, said fourth switch, and said fifth switch are controlled by a mode signal to be turned on in said first mode and turned off in said second mode; and said third switch and said sixth switch are controlled by a signal synchronous with said switching control signal.

20. The switching regulator according to claim 18, wherein, said first synchronous voltage generator comprises:

a fourth resistor and a seventh switch coupled in series between a phase node of said power stage and said synchronous terminal; and a fourth capacitor is coupled between said synchronous terminal and said ground;

wherein said second synchronous voltage generator comprises:

a fifth resistor and an eighth switch coupled between said phase node and a duplicate terminal; and a fifth capacitor coupled between said duplicate terminal and said ground;

wherein said seventh switch and said eighth switch are controlled by a mode signal to be turned on in said first mode and turned off in said second mode.

* * * * *